United States Patent

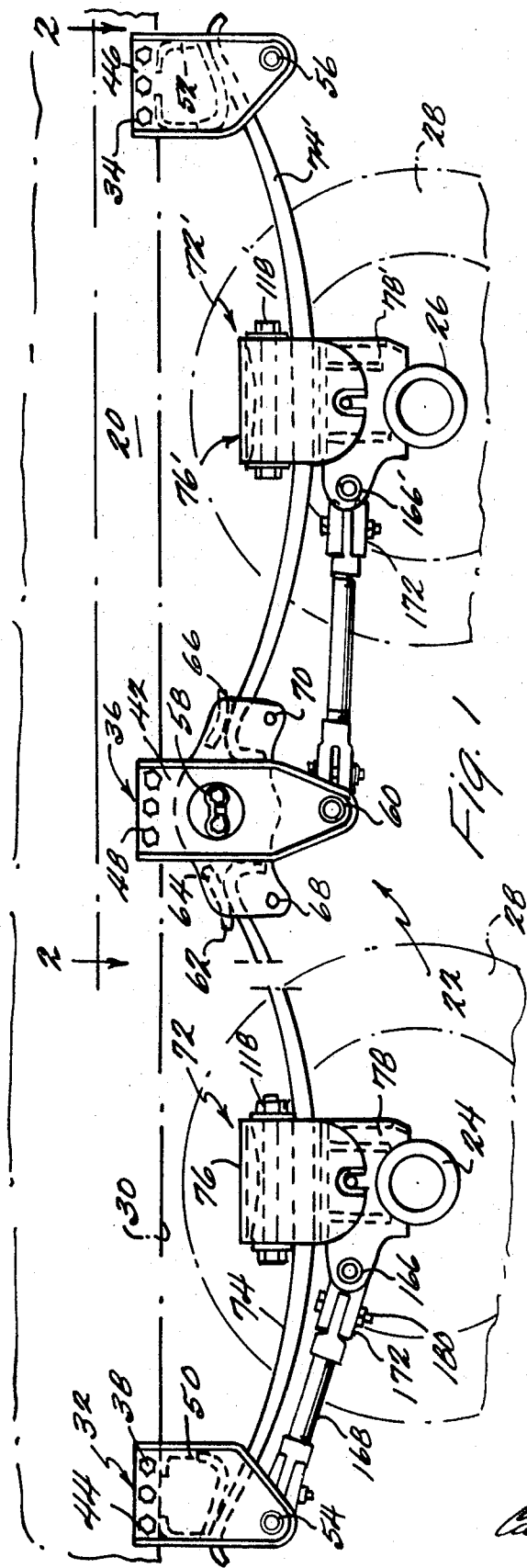

[11] 3,586,308

| [72] | Inventor | John B. King<br>Springfield, Mo. |
|---|---|---|
| [21] | Appl. No | 793,713 |
| [22] | Filed | Jan. 24, 1969 |
| [45] | Patented | June 22, 1971 |
| [73] | Assignee | Hutchens and Son Metal Products, Inc.<br>Springfield, Mo. |

[54] PREFABRICATED TANDEM AXLE ASSEMBLY
11 Claims, 4 Drawing Figs.

[52] U.S. Cl. ............................................. 267/52,
286/104.5
[51] Int. Cl. ......................................... B60g 11/02
[50] Field of Search ............................................. 267/52

[56] References Cited
UNITED STATES PATENTS

| 3,410,572 | 11/1968 | Poulos | 267/52 X |
| 3,304,096 | 2/1967 | Hanover | 267/52 X |
| 3,103,350 | 9/1963 | Chosy | 267/52 |
| 2,624,593 | 1/1953 | Stover | 267/52 X |

*Primary Examiner*—Philip Goodman
*Attorney*—Cushman, Darby & Cushman

ABSTRACT: A prefabricated spring assembly for tandem axles and the like is provided comprising axle brackets and pivotal mounting members having leaf springs passing therethrough with wedging elements locking the leaf springs in position within the mounting members. Each assembly is provided with means for detachably securing the pivotal mounting member to the axle bracket which is rigidly affixed to an axle of the vehicle whereby the pivotal mounting bracket and leaf spring assembly can be readily replaced or interchanged by substituting one prefabricated assembly for another. The prefabricated pivotal mounting member and leaf spring assemblies are assembled by: passing the leaf spring through the mounting member; applying a load to the spring in excess of any load requirements designated for the vehicle on which the assembly is to be used; drawing the wedging elements together to wedge the spring in place while the spring is under the load; securing the wedging elements in place while the spring is under the load and then releasing the load thereby forming the prefabricated spring assembly wherein the spring is affixed within the mounting member for any load up to the preloading value.

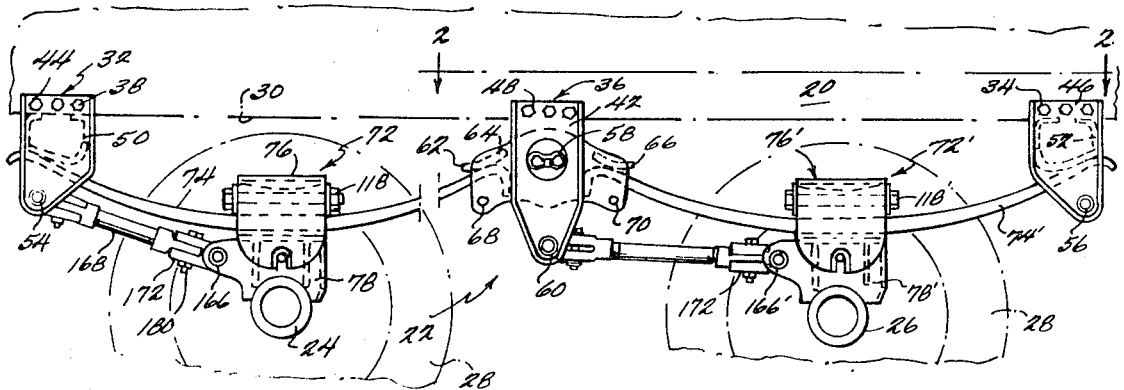

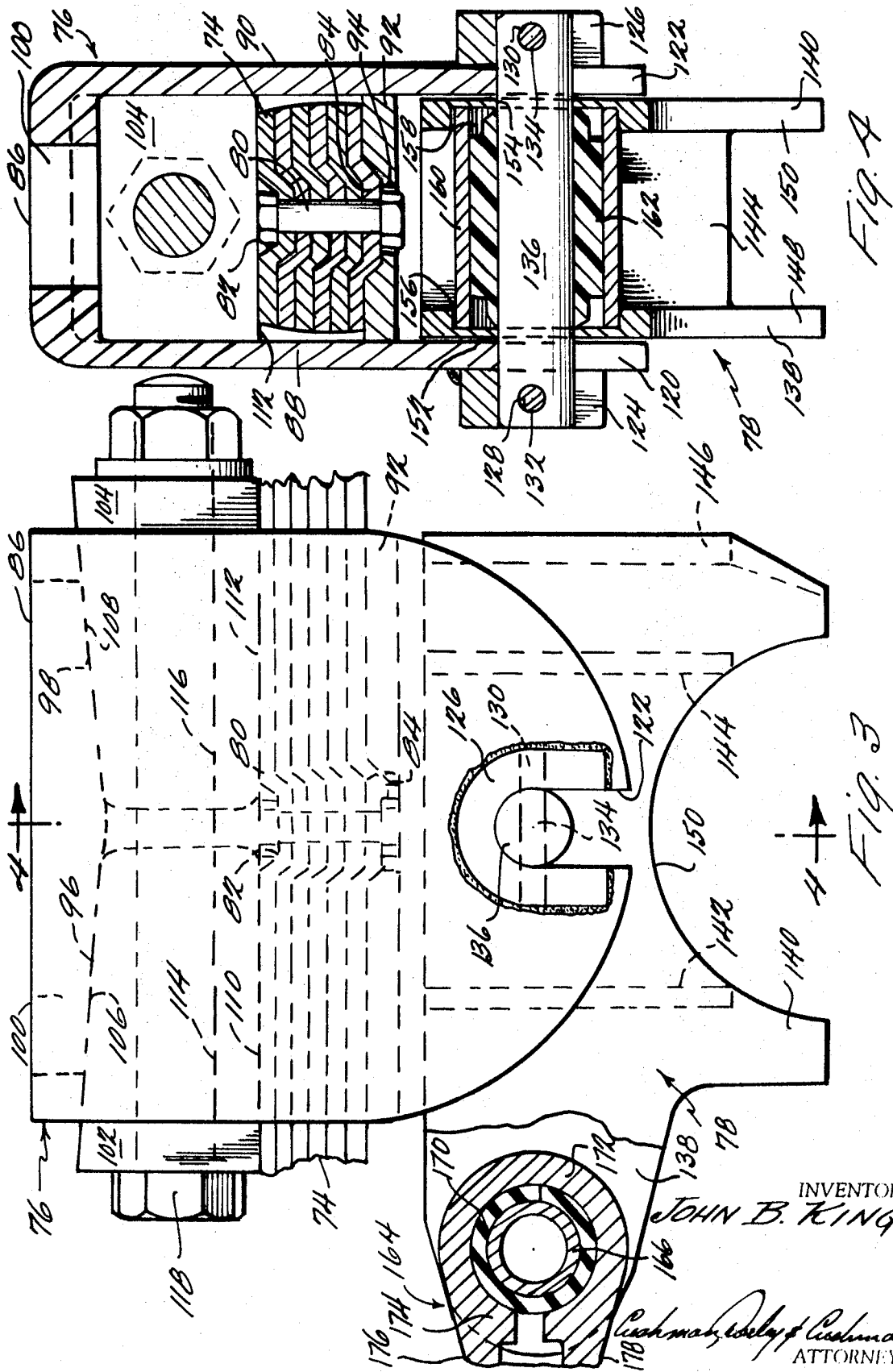

PREFABRICATED TANDEM AXLE ASSEMBLY

BRIEF DESCRIPTION OF THE INVENTION

This invention is related to axle assemblies and, more specifically, to prefabricated spring assemblies for tandem axle assemblies and the like.

Conventional tandem axle assemblies for trailers are constructed with four leaf springs, two on each side of the trailer chassis or frame. The springs are slidably associated with the vehicle frame at fixed points with some suitable bracket or equalizer arrangement between the rear of the front spring and the front of the rear spring on each side and also with hanger brackets supporting the front end of the front springs and the rear end of the rear springs. In such assemblies, when the brakes are applied, forces and torques are produced which tend to bring about undesirable movements of the springs resulting in the transfer of the vehicle load between the axles and an unequal loading of the axles whereby one axle supports a greater portion of the load than desirable for proper operation of the vehicle. In such cases, the rear of the front spring will move upward, while the front of the rear spring will move downward thereby causing brake chatter or bouncing of the wheels as well as uneven or unequal braking. In conventional tandem axle assemblies, this condition exists to a greater or lesser degree every time the brakes are applied and whether the trailer is loaded or empty.

To overcome this undesirable brake chatter or bouncing of the wheels, a tandem spring suspension system has been designed wherein the spring assemblies are pivotally mounted on the vehicle axle and torque arms extend between the axles and hanger brackets of the vehicle frame as disclosed in the patent to Charles T. Hutchens, U.S. Pat. No. 2,900,197, issued Aug. 18, 1959.

It is a primary object of the present invention to provide a prefabricated spring assembly which can be used on tandem spring suspension systems designed to minimize brake chatter or bouncing of the wheels such as suspension systems similar in construction to the system of the above-mentioned patent.

It is a further object of the invention to provide a prefabricated spring assembly which can be readily mounted on or removed from an axle with a minimum of labor.

It is still a further object of the invention to provide a prefabricated spring assembly which is simple in construction and economical to manufacture.

It is still a further object of the invention to provide a novel method of assembling said prefabricated assembly.

In accordance with a preferred form of the invention, each prefabricated spring assembly comprises a leaf spring, a pivotal mounting member which carries the leaf spring and an axle bracket which carries the pivotal mounting member and is rigidly affixed to an axle of the vehicle. The leaf spring is locked in place within the pivotal mounting member by means of a pair of wedges which are finally adjusted and secured in place while the spring is subjected to a preload during assembly in excess of the load requirements which the assembly is designated to operate under when on the vehicle. The pivotal mounting member in turn is provided with a pair of slots which carry a shaft which is rotatably mounted within the axle bracket and secured in the slots by knockout pins whereby with the insertion or removal of the knockout pins, the leaf spring and pivotal mounting member can be secured to or removed from the axle bracket.

In addition to the above, each axle bracket is provided with a tubular bracing element which serves to strengthen the bracket and provide a means for securing torque arms to the bracket. The use of tubular elements on the bracket as well as the hangers eliminates the bolt assemblies commonly used for securing torque arms intermediate the brackets and hanger assemblies thereby providing a considerable reduction in manufacturing expenses.

The above objects and advantages of the present invention will become apparent from the following detailed description when taken in conjunction with the accompanying drawings in which:

FIG. 1 is a fragmentary side elevational view of the tandem suspension assembly utilizing the prefabricated spring assembly of the present invention;

FIG. 2 is a partial plan view of the assembly taken substantially along lines 2-2 of FIG. 1;

FIG. 3 is an enlarged fragmentary side elevational view of the assembly illustrating the axle bracket and the pivotal mounting member; and FIG. 4 is a transverse cross-sectional view of the axle bracket and mounting member taken substantially along lines 4-4 of FIG. 3.

DETAILED DESCRIPTION OF THE INVENTION

Referring now to the drawings, the vehicle chassis or frame 20 is of any conventional construction. A tandem axle assembly of the invention assembly 22, which includes spaced-apart forward and rear axles 24, 26 for mounting the brake assemblies and wheels 28 is attached to the frame as will be more fully explained hereinafter.

The assembly shown in FIG. 1 constitutes the structure of assembly 22 at one side of frame 20 only. It is to be understood that the assembly includes similar structure, similarly arranged on the opposite side of the frame. However, for the purpose of this description, only one side of the assembly is shown inasmuch as for all practical purposes, both sides are identical and therefore a description of the other half of the assembly would involve unnecessary repetition.

Frame rail 30 of vehicle frame 20 is provided with a front hanger element 32, a rear hanger element 34 and an intermediate hanger element 36. Each of the hanger elements 32, 34 and 36 comprises pairs of transversely spaced sideplates 38, 40 and 42, respectively, which are rigidly secured to the frame rail 30 by bolt assemblies 44, 46, 48 or equivalent fastening means. The sideplates of hangers 32 and 34 are interconnected by metallic hanger wear pads 50, 52 and tubular braces 54, 56 which are welded or otherwise suitably affixed to the sideplates of the hangers. As shown in FIG. 1, wear plates 50 and 52 are welded to the opposing faces of the hanger sideplates, while tubular braces 54 and 56 have end portions which are received within apertures passing through the sideplates.

Sideplates 42 of hanger 36 are interconnected by a sleeve, which is secured to the sideplate by bolt assemblies 58, and a tubular brace 60 which passes through apertures in the sideplates and is welded to the sideplates. A conventional equalizer 62 with wear plates 64, 66 and braces 68, 70, such as the one disclosed in the above-identified patent to Hutchens, U.S. Pat. No. 2,900,197, is pivotally mounted on the sleeve and serves to transmit forces between the spring assemblies and from the frame to the spring assemblies.

The spring and torque arm assemblies of axles 24 and 26 are identical in construction and, therefore, the following detailed description of the spring and torque arm assemblies of axle 24 applies also to the assemblies of axle 26 with like components of the assemblies of axles 24 and 26 having unprimed and primed reference numerals, respectively.

The spring suspension assembly 72 of axle 24 comprises spring 74, pivotal mounting member 76 and axle bracket 78. Spring 74 is a conventional laminated leaf spring made up of separate elements which are kept in longitudinal alignment with respect to one another by means of a vertically extending bolt assembly 80 which passes through the center of the leaf spring. As shown, each of the leaf spring elements is provided with a depression 82 to facilitate the mounting of bolt assembly 80 within the leaf spring and to permit the nesting of successive depressions 82 within each other. The resulting boss 84 on the underside of the spring facilitates the centering of the spring relative to the pivotal mounting member 76 as will be more fully explained hereinafter.

The readily detachable pivotal mounting member 76 comprises a web 86 and depending sideplates 88 and 90 which are interconnected by means of spring seating plate 92 which is welded or otherwise rigidly secured to sideplates 88, 90 at a position spaced from web 86. Plate 92 is provided with a central vertically extending aperture 94 which is complementary to and receives the boss 84 of spring 74 to properly position the spring within the readily detachable mounting member.

Web 86 is provided with underside surfaces 96, 98 that are downwardly inclined from the ends of the web to its center. In addition, an elongated slot 100 passes from the upper surface of the web 86 through to surfaces 96, 98 and provides an opening for the welding of wedges 102, 104 to the mounting bracket 76.

Wedges 102 and 104 are rectangular in transverse cross section and have surfaces 106, 108 with tapers complementary to the angle of inclination of surfaces 96, 98 whereby movement of the wedges 102, 104 toward each other causes the clearance between the undersides 110, 112 of the wedges and the upper surface of plate 92 to diminish. Thus, the wedges 102, 104 and plate 92 form a clamping assembly for firmly locking the spring 74 in place when the wedges are drawn toward each other. The wedges are provided with longitudinally extending apertures 114, 116 extending therethrough, which are aligned with respect to each other, and receive a bolt assembly 118 which can be used to draw the wedges together and maintain them in place. Of course, once the wedges are properly positioned relative to one another as mentioned above, the wedges 102, 104 can be welded to the pivotal mounting member and the bolt assembly 118 removed or alternative means can be used to draw the wedges together and the bolt 118 can be dispensed with all together.

The lower ends of sideplates 88 and 90 are provided with vertically extending slots 120, 122 which are located on a vertically extending transverse plane passing through the center line of the pivotal mounting member. The slots 120, 122 are open at their lower ends while the upper ends of the slots are rounded. U-shaped bosses 124, 126 having the same internal dimensions as slots 120, 122 are welded or otherwise rigidly secured to the inner and outer surfaces of plates 88 and 90 adjacent slots 120. 122. Bosses 124, 126 are provided with aligned apertures 128, 130 for receiving knockout pins 132, 134 which are utilized to secure pivotal mounting member 76 to rod 136 of the axle bracket 78.

Axle bracket 78 comprises a pair of spaced-apart sideplates 138, 140 which are joined by transverse vertical bracing plates 142, 144 and 146, that are welded or otherwise rigidly affixed to opposing faces of plates 138, 140. Plates 138, 140 have cutaway portions defined by edges 148, 150, which are complementary in configuration to the cross section of the axle on which the plates are to be mounted. As illustrated in FIGS. 1 and 3, edges 148 and 150 are semicircular and are welded or otherwise rigidly secured to axles 24, 26.

Plates 138 and 140 are each provided with transversely aligned apertures 152 and 154 which are centered over the axle for receiving mounting rod 136. In addition, the plates are provided with opposed disc-shape depressions 156, 158 which are concentric with respect to the apertures 152, 154. These depressions receive a metal sleeve 160 which extends between and is welded or otherwise rigidly secured to the sideplates 138, 140. A rubber bushing 162 is mounted within the sleeve 160 with the outer surface of the bushing 162 engaging the interior of sleeve 160 and the interior surface of the bushing engaging rod 136. The bushing 162 can be affixed to the sleeve 160 but is slidably received on rod 136 to permit pivotal movement of mounting member 76 relative to the axle bracket and the insertion or removal of rod 136 from the axle bracket if needed.

Brackets 78 are each provided with a forward projecting portion 164 formed by extensions of plates 138 and 140. Tubular braces 166, 166' extend between and through plates 138 and 140 and are rigidly welded or otherwise secured to the plates. These braces 166, 166' also serve as a means for mounting torque arms 168 to the brackets with the other ends of the torque arms 168 being secured to tubular braces 54 and 60. Tubular braces 166, 166', 54 and 60 are wrapped with strips of rubber 170, which encircle the entire periphery of the braces, and the torque arms 168 are then clamped to the braces with the rubber strips acting as bushings. The clamps 172 utilized to secure the torque arms 168 each comprises a rounded U-shaped portion 174 which engages the bushings and a pair of extensions 176, 178 having opposed concave surfaces that are bolted to the ends of the torque arms by bolt assemblies 180. The tightening of bolt assemblies 180 draws the extensions of the clamps together and the sides of the U-shaped portions to firmly clamp the torque arms on the braces. Through the use of clamps 172 in combination with the tubular braces, the need for bolt assemblies on the axle brackets and hangers is eliminated thereby reducing the cost of manufacture and simplifying the suspension system. As shown, the torque arms 168 can be of any conventional construction with a provision for adjusting the torque arms as necessitated by the specific assembly requirements.

The preferred method of assembling the prefabricated pivotal mounting member 76 and leaf spring 74 is as follows. The leaf spring 74 is extended through the pivotal mounting member 76 intermediate web 86 and plate 92 with the spring being centered relative to the mounting member 76 by means of boss 84 on the leaf spring 74 and the complementary aperture 94 in plate 92. Wedges 102 and 104 are then inserted part way into the spaces formed between the upper surface of spring 74 and the underside surfaces 96, 98 of web 86 until the wedges engage both the upper surface of spring 74 and the surfaces 96, 98 of web 86. Bolt assembly 118 is then passed through the wedges and the nut of the assembly is tightened until the bolt assembly snugly engages the end faces of wedges 102, 104. Next, the ends of the leaf spring are subjected to a specified load in excess of the load requirements designated for the vehicle or class of vehicles on which the assembly is to be used thereby tending to decrease the curvature of the spring assembly. While the load is still being applied to the ends of the spring 74, bolt assembly 118 is tightened to draw the wedges 102, 104 together until the wedges are firmly wedged between the upper surface of spring 74 and surfaces 96, 98 of web 86 thereby locking the spring in position for any load up to and including the load applied during assembly. The wedges 102, 104 are now welded in place by welding the wedges to the walls of slot 100 and the end faces of the mounting member. After the wedges are welded in place, the loading on the spring ends is eliminated with the resulting return of the spring to its initial curvature further locking the spring in position within the mounting member 76. The spring and mounting member are now ready to be mounted on axle bracket 78 merely by sliding the slots 120, 122 of mounting member 76 over the rod 136 and inserting knockout pins 132, 134 through the apertures 128, 130.

Of course, the assembly of the mounting bracket 76 and spring 74 preferably takes place in the factory and the spring can then be shipped to wherever needed for mounting on a vehicle whether the assembly is required to replace a damaged spring assembly or whether it is desired to substitute a heavier or lighter spring for one already on the vehicle. While the method of assembly set forth above includes the welding of the wedges in place after they have been adjusted to their final position thereby permitting the removal of bolt assembly 118, which is no longer needed, the bolt assembly can be left in the assembly and the welding dispensed with or the assembly can utilize both the bolt assembly 118 and the welding of the wedges to the bracket 76 if desired.

While the preferred form of the invention has been shown and described, it is to be understood that other suitable modifications and equivalents can be resorted to which fall within the scope of the invention.

I claim:

1. A prefabricated spring assembly for single and multiple axle vehicles comprising:

axle bracket means for securing said prefabricated spring assembly to an axle of a vehicle;

pivotal spring-mounting means pivotally carried by said axle bracket means, said pivotal spring-mounting means being readily mountable on and separable from said axle bracket means; and spring means carried by said pivotal spring mounting means, said spring means being locked in place with respect to said spring mounting means by wedging means;

shaft means carried by said axle bracket means for pivotally securing said pivotal spring-mounting means to said axle bracket means, said shaft means extending substantially parallel to the vehicle axles longitudinal axes;

said pivotal spring-mounting means having two aligned slots which receive said shaft means; and fastener means disengageably engaging between the shaft means and the pivotal spring-mounting means for removably securing the shaft means in the slots.

2. In the prefabricated spring assembly of claim 1:

said pivotal spring-mounting means having an upper web with transversely spaced-apart flanges depending from said web and a plate, vertically spaced with respect to said web, extending between said depending flanges and secured to said depending flanges;

said spring means extending through said pivotal spring-mounting means intermediate said web and said plate; and said wedging means cooperating with said web and said plate to lock said spring means in place with respect to said spring-mounting means.

3. In the prefabricated spring assembly of claim 2:

said web having an underside complementary in configuration to said wedging means whereby movement of said wedging means relative to said underside of said web varies the clearance between said wedging means and said plate.

4. In the prefabricated spring assembly of claim 2:

said wedging means being held in place by bolt assembly means and said wedging means in combination with said web and plate exerting a clamping force on said spring means to maintain said spring in a locked position with respect to said spring-mounting means up to a predetermined spring loading.

5. In the prefabricated spring assembly of claim 2:

said wedging means being welded to said pivotal spring-mounting means and said wedging means in combination with said web and plate exerting a clamping force on said spring means to maintain said spring in a locked position with respect to said spring-mounting means up to a predetermined spring loading.

6. In the prefabricated spring assembly of claim 2:

said wedging means in combination with said web and said plate exerting a clamping force on said spring means to maintain said spring means in a locked position with respect to said spring-mounting means up to a predetermined spring loading.

7. In the prefabricated spring assembly of claim 1:

said wedging means in combination with said spring-mounting means exerting a clamping force on said spring means to maintain said spring means in a locked position with respect to said spring-mounting means up to a predetermined spring loading.

8. In the prefabricated spring assembly of claim 1, said slots being open-ended and said fastener means comprising knockout pins passing through and being wedged within means defining aligned apertures in said shaft means and said pivotal spring-mounting means.

9. In the prefabricated spring assembly of claim 8:

said wedging means in combination with said spring-mounting means exerting a clamping force on said spring means to maintain said spring means in a locked position with respect to said spring-mounting means up to a predetermined spring loading.

10. In the prefabricated spring assembly of claim 9:

said axle bracket means having tubular brace means for mounting a torque arm on said axle bracket means.

11. A prefabricated spring assembly for single and multiple axle vehicles comprising:

axle bracket means for securing said prefabricated spring assembly to an axle of a vehicle;

pivotal spring-mounting means pivotally carried by said axle bracket means, said pivotal spring-mounting means being readily mountable on and separable from said axle bracket means; and spring means carried by said pivotal spring-mounting means, said spring means being locked in place with respect to said spring-mounting means by wedging means;

shaft means carried by said axle bracket means, said shaft means adapted to extend parallel to the longitudinal axis of an axle on which said axle bracket is mounted;

said pivotal spring-mounting means having open-ended slots therein for receiving said shaft means with said shaft means being retained within said slots by knockout pins which pass through and are wedged within aligned apertures in said shaft means and said pivotal spring-mounting means;

said pivotal spring-mounting means having an upper web with transversely spaced-apart flanges depending from said web and a plate, vertically spaced with respect to said web, extending between and secured to said depending flanges;

said spring means extending through said pivotal spring-mounting means intermediate said web and said plate, said spring means having boss means extending into an aperture in said plate to align said spring means within said pivotal spring-mounting means; and said wedging means cooperating with said web and said plate to lock said spring means in place with respect to said spring-mounting means up to a predetermined spring loading.